US012209601B2

(12) United States Patent
Smith et al.

(10) Patent No.: US 12,209,601 B2
(45) Date of Patent: Jan. 28, 2025

(54) HYDRAULIC CYLINDER MONITORING

(71) Applicant: The Heil Co., Chattanooga, TN (US)

(72) Inventors: John Forrest Smith, Fort Payne, AL (US); Alejandro de Leon, Fort Payne, AL (US); Garrett Eckerl, Fort Payne, AL (US); Albert Xiaoxia Jiang, Chattanooga, TN (US); Thomas Leon Wilding, Willard, UT (US)

(73) Assignee: The Heil Co., Chattanooga, TN (US)

( * ) Notice: Subject to any disclaimer, the term of this patent is extended or adjusted under 35 U.S.C. 154(b) by 0 days.

(21) Appl. No.: 17/578,200

(22) Filed: Jan. 18, 2022

(65) Prior Publication Data

US 2022/0243746 A1 Aug. 4, 2022

Related U.S. Application Data

(60) Provisional application No. 63/144,288, filed on Feb. 1, 2021.

(51) Int. Cl.

*F15B 15/28* (2006.01)
*F15B 19/00* (2006.01)
*F15B 20/00* (2006.01)

(52) U.S. Cl.

CPC ...... *F15B 15/2838* (2013.01); *F15B 15/2815* (2013.01); *F15B 19/005* (2013.01); (Continued)

(58) Field of Classification Search

CPC ................ F15B 15/2815; F15B 19/005; F15B 20/005; F15B 2211/6336; F15B 2211/6343; F15B 2211/864; F15B 2211/87

See application file for complete search history.

(56) References Cited

U.S. PATENT DOCUMENTS 5,351,613 A 10/1994 Newsom
7,120,523 B2 10/2006 Muller
(Continued)

FOREIGN PATENT DOCUMENTS

AU 2017201973 4/2019
CA 2966963 5/2018
(Continued)

OTHER PUBLICATIONS

JPH10281113A_t machine translation thereof (Year: 1998).*
Office Action in Canadian Appln. No. 3,146,921, mailed on Dec. 15, 2023, 4 pages.

*Primary Examiner* — Kenneth Bomberg
*Assistant Examiner* — Matthew Wiblin
(74) *Attorney, Agent, or Firm* — Fish & Richardson P.C.

(57) ABSTRACT

A refuse collection vehicle has various hydraulic actuators including at least one cylinder with an internal seal. A sensor is responsive to movement of the piston and sends a signal to a controller to indicate piston movement information during an associated vehicle body component movement. The controller is configured to determine a motion characteristic of the piston during a predetermined body component movement, compare the determined motion characteristic to a stored reference motion characteristic, and in response to determining that a difference between the determined motion characteristic and the reference motion characteristic is greater than a predetermined value, trigger an indication that the refuse collection vehicle is in need of service.

26 Claims, 5 Drawing Sheets

(52) U.S. Cl.
CPC ..... *F15B 20/005* (2013.01); *F15B 2211/6336* (2013.01); *F15B 2211/6343* (2013.01); *F15B 2211/864* (2013.01); *F15B 2211/87* (2013.01)

(56) References Cited

U.S. PATENT DOCUMENTS

| | | | | |
|---|---|---|---|---|
| 7,302,875 | B2 | 12/2007 | Fukuchi | |
| 10,207,866 | B1 | 2/2019 | Dunbar | |
| 10,347,097 | B2 | 7/2019 | Syrjälahti et al. | |
| 10,382,915 | B2 | 8/2019 | Rodoni | |
| 10,467,881 | B2 | 11/2019 | Chen et al. | |
| 10,480,549 | B2 | 11/2019 | Fujiwara | |
| 10,495,544 | B1 | 12/2019 | Billing et al. | |
| 2002/0193924 | A1 | 12/2002 | Muller | |
| 2005/0234660 | A1 * | 10/2005 | Kambli | F15B 19/005 702/51 |
| 2006/0082444 | A1 | 4/2006 | Sweeney et al. | |
| 2017/0051462 | A1 | 2/2017 | Amin et al. | |
| 2017/0076344 | A1 | 3/2017 | McQuade et al. | |
| 2017/0138018 | A1 * | 5/2017 | Beschorner | E02F 9/2296 |
| 2017/0211600 | A1 * | 7/2017 | Smith | G01M 3/28 |
| 2017/0241414 | A1 | 8/2017 | Billing et al. | |
| 2017/0329742 | A1 | 11/2017 | McQuade et al. | |
| 2019/0033162 | A1 * | 1/2019 | Gafur | G01M 3/00 |
| 2019/0063207 | A1 | 2/2019 | Harrison et al. | |
| 2019/0136771 | A1 | 5/2019 | Engfehr et al. | |
| 2019/0177151 | A1 | 6/2019 | Fadler et al. | |
| 2019/0188584 | A1 | 6/2019 | Rao et al. | |
| 2019/0311333 | A1 | 10/2019 | Kekalainen et al. | |
| 2019/0360822 | A1 | 11/2019 | Rodoni et al. | |
| 2019/0364397 | A1 | 11/2019 | Rodoni | |
| 2022/0031544 | A1 * | 2/2022 | Müller | A61G 7/018 |
| 2022/0298755 | A1 * | 9/2022 | Udagawa | F04B 49/10 |

FOREIGN PATENT DOCUMENTS

| | | | | |
|---|---|---|---|---|
| DE | 102014109436 A1 * | 1/2015 | B25D 9/26 |
| EP | 0793579 | 7/2002 | |
| EP | 3261031 | 12/2017 | |
| EP | 3314453 | 5/2018 | |
| EP | 3369081 | 9/2018 | |
| EP | 2480871 | 3/2019 | |
| EP | 3525180 | 8/2019 | |
| EP | 3284692 | 11/2019 | |
| GB | 2510179 | 8/2019 | |
| IN | 201821034061 | 10/2018 | |
| JP | H 10281113 A * | 10/1998 | F15B 20/00 |
| WO | WO 1995012687 | 5/1995 | |
| WO | WO 2016209577 | 12/2016 | |
| WO | WO 2017074519 | 5/2017 | |
| WO | WO 2018232419 | 12/2018 | |
| WO | WO 2019084163 | 5/2019 | |
| WO | WO 2019216975 | 11/2019 | |

* cited by examiner

HYDRAULIC CYLINDER MONITORING

CROSS-REFERENCE TO RELATED APPLICATION

This application claims the benefit under 35 U.S.C. § 119(e) of U.S. Patent Application No. 63/144,288, entitled "Hydraulic Cylinder Monitoring," filed Feb. 1, 2021, which is incorporated herein by reference in its entirety.

TECHNICAL FIELD

This invention relates to monitoring hydraulic components such as cylinders over their useful life, and more particularly to scheduling cylinder service or replacement based on monitored cylinder performance.

BACKGROUND

Refuse collection vehicles or garbage trucks are examples of the types of vehicles having several functions that are driven by hydraulic cylinders. For example, power hydraulics may be used to lift heavy containers filled with refuse and dump them into the truck. Other cylinders may be used to compact the refuse, or to lift/lower heavy tailgates to empty the truck. Such hydraulic cylinders may operate with fluid pressures of 2000 psi or more, and may be expected to perform hundreds of thousands of cycles over their useful life. A common form of cylinder failure is fluid leakage. Increasing leakage may indicate that the cylinder is nearing the end of its useful life and in need of repair or replacement.

In the refuse collection business, vehicle downtime is expensive and fleet operators have to maintain extra vehicles simply to keep up with collection routes when vehicles unexpectedly need to be taken out of service for maintenance.

SUMMARY

Improvements in predicting when hydraulic components such as cylinders would need to be repaired or replaced would reduce fleet operating costs by allowing fleet operators to make such repairs or replacements during scheduled maintenance, rather than having to unexpectedly take a vehicle out of service.

One aspect of the invention features a refuse collection vehicle with a hydraulic pump, and multiple hydraulic actuators each in hydraulic communication with the pump through a respective hydraulic valve operable to supply hydraulic power to cause the actuator to move a respective vehicle body component. At least one of the actuators includes a hydraulic cylinder containing a piston carrying an internal cylinder seal and separating an internal cylinder volume into two portions, such that a potential leak path between the two portions is defined between the seal and an internal surface of the cylinder. The vehicle also includes a sensor responsive to movement of the piston, and a controller connected to the sensor to receive a sensor signal indicating piston movement information during an associated body component movement. The controller is configured to determine a motion characteristic of the piston during a predetermined body component movement; compare the determined motion characteristic to a stored reference motion characteristic; and in response to determining that a difference between the determined motion characteristic and the reference motion characteristic is greater than a predetermined value, trigger an indication that the refuse collection vehicle is in need of service.

In some embodiments, the motion characteristic is a length of time required for the piston to traverse a distance from a predetermined start point to a predetermined end point.

In some embodiments, the motion characteristic is a velocity of the piston during the associated body component movement. The velocity may be an averaged plateau velocity of the piston during the associated body component movement, for example, or an average velocity of the piston over a predetermined span of positions.

In some cases, the controller is configured to determine the motion characteristic of the piston while the hydraulic valve operable to supply hydraulic power to the hydraulic cylinder is the only valve supplying hydraulic power to any of the hydraulic actuators.

In some examples, the hydraulic valve operable to supply hydraulic power to the hydraulic cylinder is an automated valve electrically controlled by a valve control signal to drive the automated valve to a determined open position during the associated body component movement. In some cases, the automated valve is configured to be held in the determined open position while the controller determines the motion characteristic of the piston.

In some embodiments, the controller is configured to determine the motion characteristic of the piston as the piston moves toward a rod seal end of the cylinder.

In some other embodiments, the controller is configured to determine the motion characteristic of the piston while the hydraulic valve operable to supply hydraulic power to the hydraulic cylinder is in a closed position and the cylinder piston is under a known applied axial load. For example, the controller may be configured to determine the motion characteristic of the piston during a dwell portion of the associated body component movement.

Preferably, the controller is configured to determine the motion characteristic of the piston only when a temperature of hydraulic fluid in a hydraulic system including the pump is within a predetermined temperature range, such as a temperature range in which fluid viscosity does not substantially change with respect to temperature.

Another aspect of the invention features a method of prompting service of a hydraulic cylinder on a refuse collection vehicle. The method includes determining a motion characteristic of the hydraulic cylinder during a predetermined range of cylinder motion, comparing the determined motion characteristic to a reference motion characteristic associated with the hydraulic cylinder, and in response to determining that a difference between the determined motion characteristic and the reference motion characteristic is greater than a predetermined value, triggering an indication that the refuse collection vehicle is in need of service.

In some embodiments, the motion characteristic is determined during an associated movement of a body component of the vehicle. The body component may be, for example, a lift arm assembly, a tailgate, a lift arm fork, a packer ram, or a hopper lid.

In some cases, the motion characteristic is a length of time required for a piston of the hydraulic cylinder to traverse a distance from a predetermined start point to a predetermined end point. In some cases, the motion characteristic is a velocity of a portion of the cylinder during the associated body component movement. In some examples, the velocity is an averaged plateau velocity of the cylinder portion during the associated body component movement, or an average velocity of the cylinder portion over a predetermined span of positions.

In some applications the method also includes operating a hydraulic valve operable to supply hydraulic power to the hydraulic cylinder while the motion characteristic is determined.

In some cases, the motion characteristic is determined while the hydraulic cylinder is extended.

The method may also include sensing temperature of hydraulic fluid in a hydraulic system including the hydraulic cylinder, with the motion characteristic is determined only when the sensed temperature is within a predetermined temperature range.

In some cases, the hydraulic cylinder is a lift cylinder connected to a lift arm of the refuse collection vehicle.

In some examples, the method also includes scheduling a service of the hydraulic cylinder in response to determining that the difference between the determined motion characteristic and the reference motion characteristic is greater than the predetermined value. The scheduling may be made automatically, for example, by a signal sent from a controller on the vehicle to a remote server or service facility.

In some cases the method also includes comparing a measured pump flow rate to a baseline pump flow rate associated with the reference motion characteristic to determine flow degradation, and then adjusting the determined motion characteristic as a function of the determined flow degradation before comparing the determined motion characteristic to the reference motion characteristic.

The invention can help to avoid unexpected vehicle downtime by triggering service (repair or replacement) of hydraulic cylinders before internal leakage becomes so excessive that system performance is overly diminished. It can also help with anticipating service needs so that repair or replacement parts may be obtained in advance.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
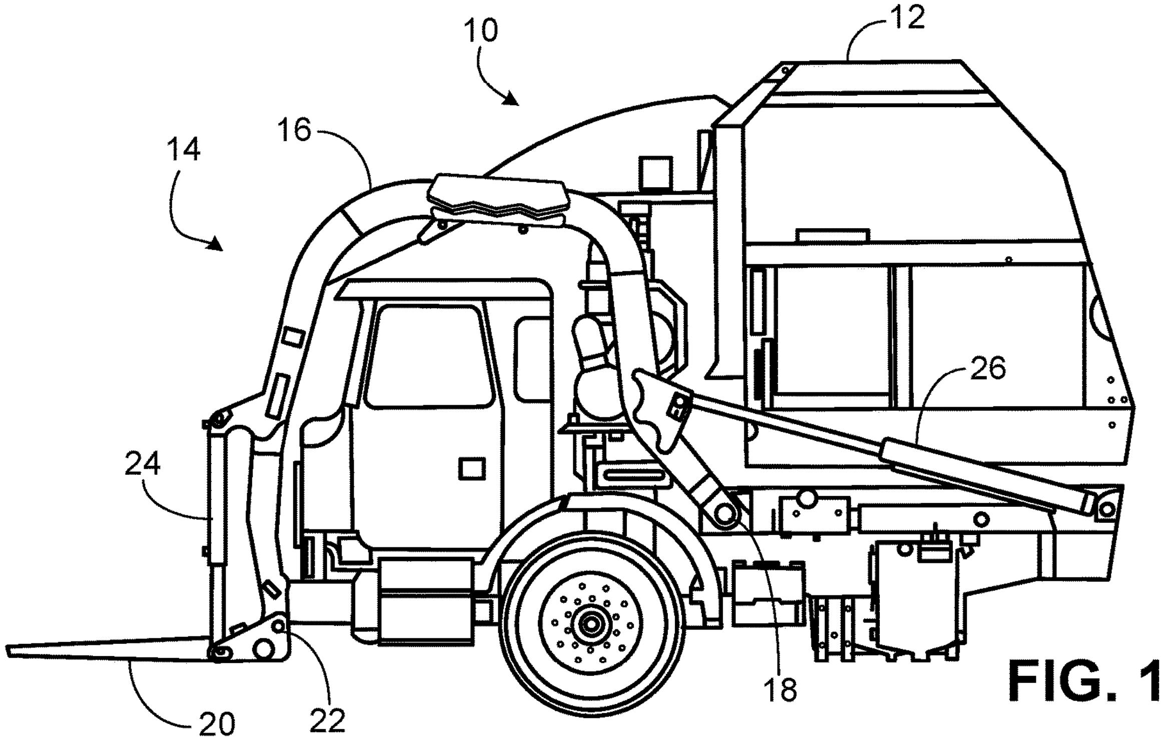
FIG. 1 is a side view of a forward portion of a front-loading refuse collection vehicle, with lift arms lowered.
Figure 2:
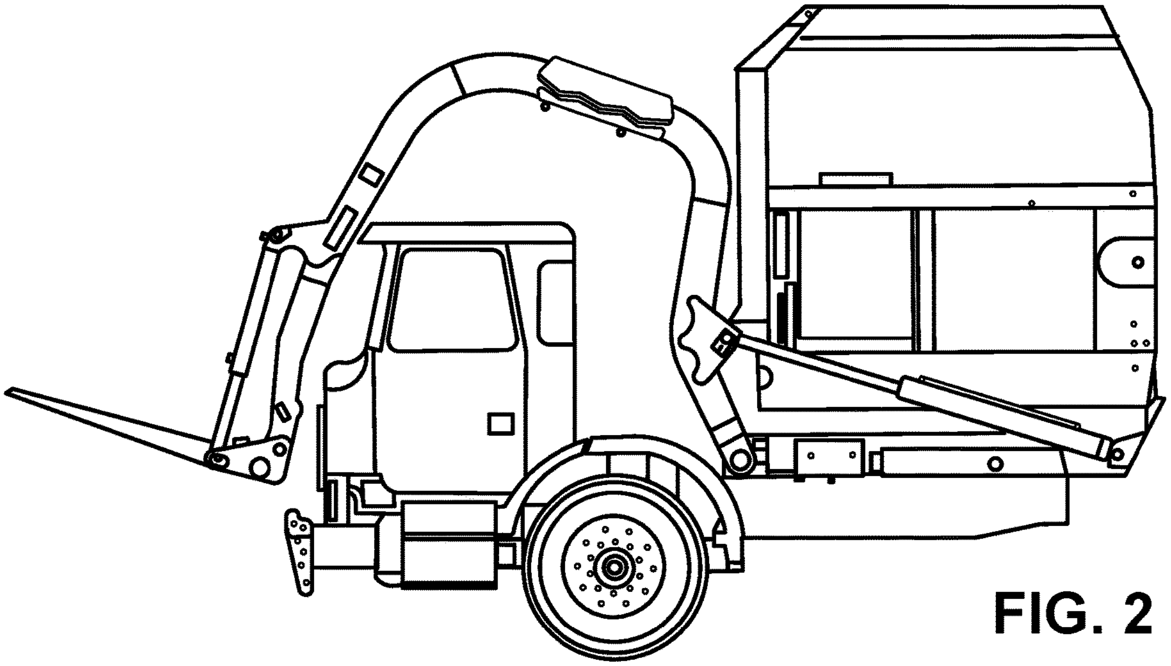
FIGS. 2-6 progressively illustrate a lifting of the lift arms to empty a lifted trash receptacle into a rear hopper of the vehicle.
Figure 3:
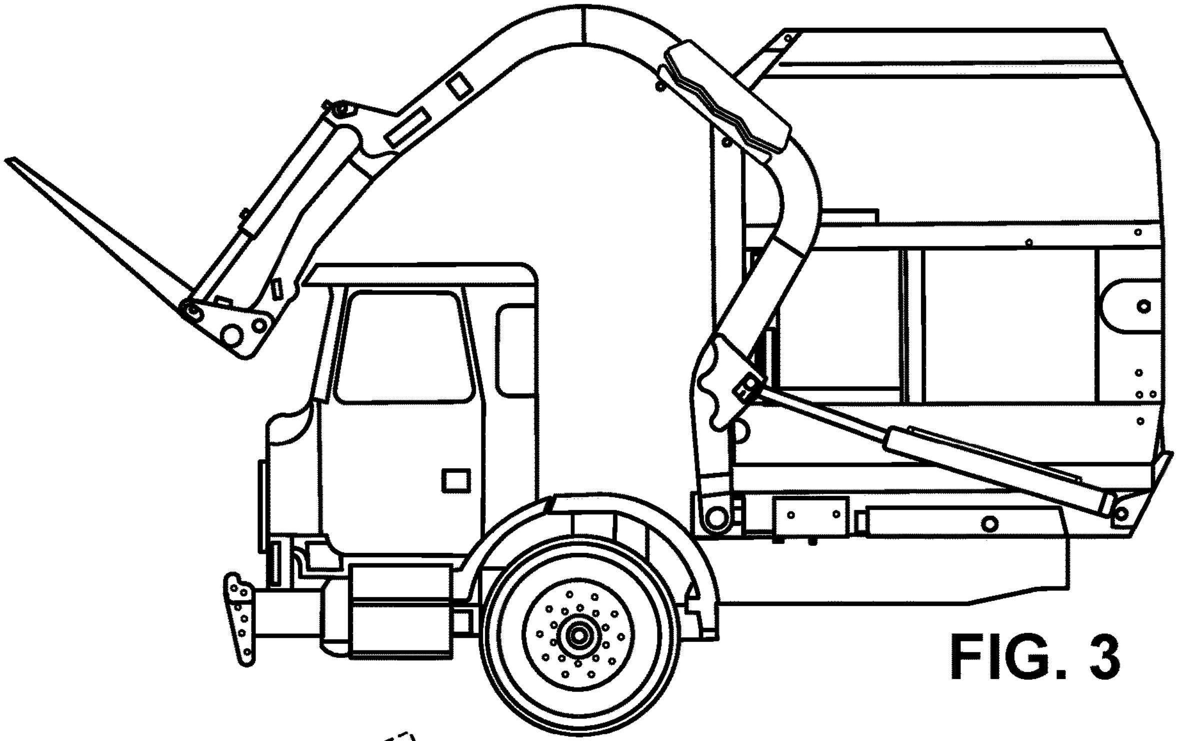

Referring first to FIG. 1, a refuse collection vehicle (RCV) 10, such as a garbage truck, has a hopper 12 open at the top for receiving and transporting refuse. The illustrated RCV is configured as a front loader and has a lift assembly 14 with a pair of lift arms 16 pivotable about collinear arm pivots 18 on either side of the vehicle. The arms are connected to each other structurally at their distal ends, at which they carry a pair of lift tines 20 that are pivotable about a tine pivot 22 by hydraulic cylinders 24. Lift tines 20 are sized and spaced to engage lift tubes on either side of a standard waste dumpster, for example, for lifting the dumpster (not illustrated) to dump the contents of the dumpster into hopper 12.

Lift assembly 14 is operable by a pair of hydraulic lift cylinders 26, one on either side of the vehicle. Each lift cylinder 26 is pivotably connected at a rear end to the vehicle frame, and at a forward end to a respective one of the lift arms 16 at a point spaced from the arm pivot 18, such that retraction of the lift cylinder pulls on the lift arm to raise the forward portion of the lift assembly and the lift tines, to raise an engaged trash receptacle, and subsequent extension of the lift cylinder lowers the trash receptacle. FIG. 1 shows the lift assembly in a fully lowered position, with the lift cylinder 26 fully extended.

FIGS. 2-6 sequentially show positions of the lift assembly during a lifting process. In each successive figure the lift cylinder has retracted more than in the previous figure, the lift arms have pivoted further clockwise about arm pivots 18, and tines 20 have raised further from the ground.

Figure 4:
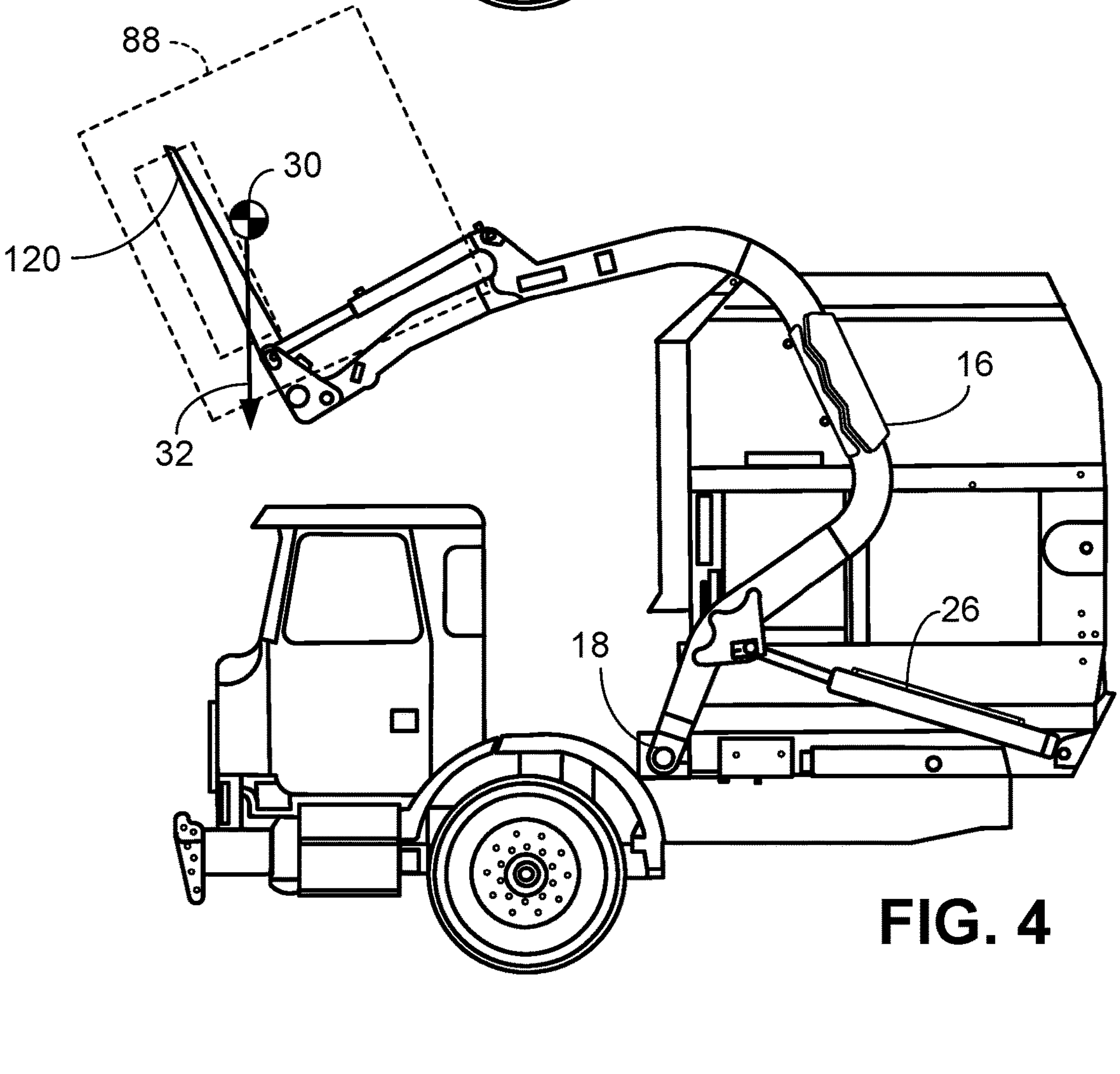
Figure 5:
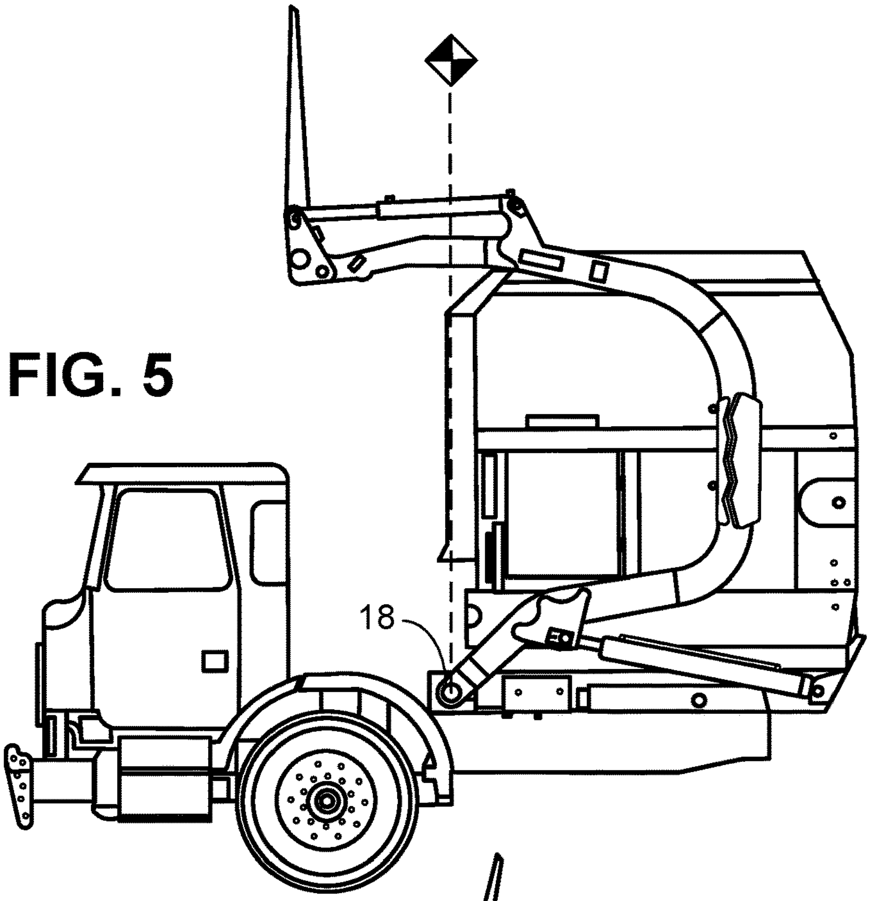

In FIG. 4 a representative trash receptacle 28 is shown in dashed outline, in the process of being lifted by tines 20. The weight and weight distribution of a loaded trash receptacle will vary, and the contents may shift during lifting. For purposes of this discussion, the instantaneous center of gravity of the trash receptacle, including its contents, is shown as reference 30, and the force of its weight by arrow 32. In this position, the weight of the trash receptacle generates a counter-clockwise torque about arm pivot 18, while the lift cylinder 26 pulls on lift arm 16 to generate a clockwise torque. The other torque affecting pivoting of the lift arm is the effective weight of the lift assembly itself, without the trash receptacle. With the lift tines extended, the position of the center of gravity of the lift assembly is known.

Figure 6:
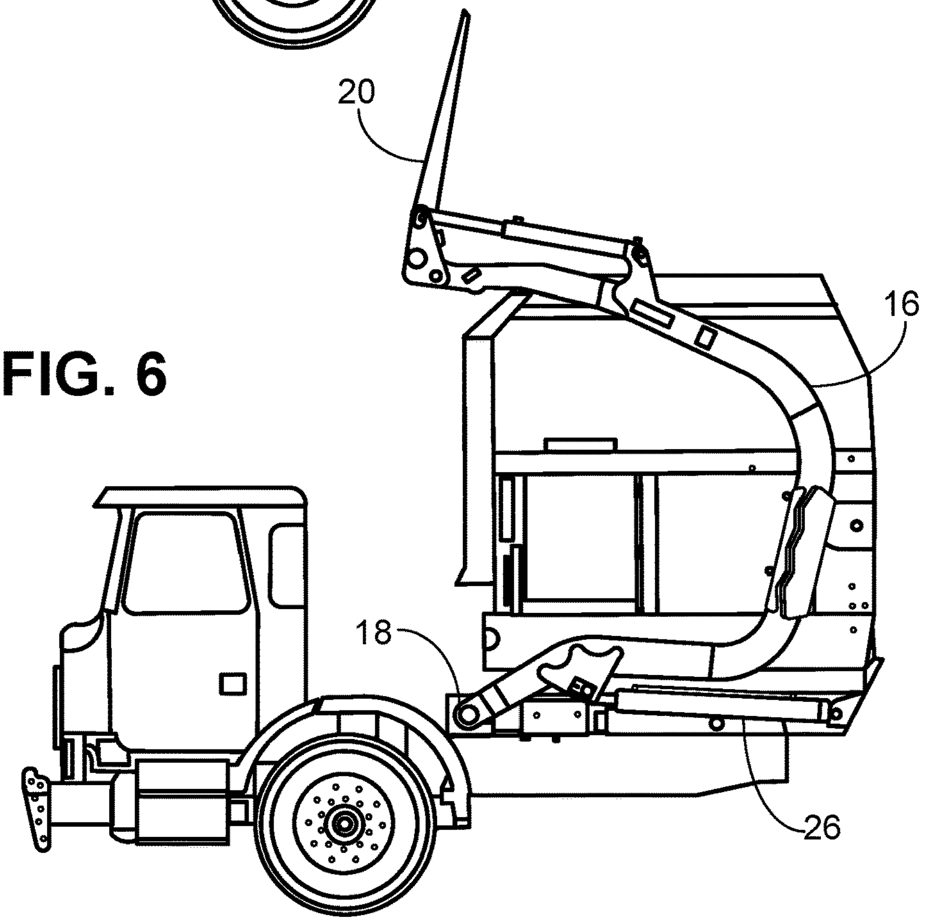

At some point in the lifting process, the instantaneous combined center of gravity of the trash receptacle and the lift assembly will pass directly over arm pivot 18. This combined center of gravity is illustrated with a diamond in FIG. 5. As lift cylinder 26 continues to retract beyond this point, the weight of the lift assembly and carried trash receptacle will cause a clockwise torque about arm pivot 18. At this point, the lift cylinder may switch from pulling on the lift arm (to lift the weight) to pushing on the lift arm (to slow further pivoting of the lift assembly). We refer to this position as crossover, where the lift assembly shifts to an overhung load condition. Retraction of the lift cylinders continue until the lift assembly has pivoted sufficiently to cause the contents of the trash receptacle to fall into hopper 12. Emptying of the trash receptacle can be aided by pivoting of the tines, if needed. FIG. 6 shows lift cylinder 26 in a fully retracted position.

After the trash receptacle has been emptied, it is lowered back to the ground in a reverse of the above process, with lift cylinder 26 extended until crossover is reached (which will be at a different pivot position than during lift, given that the trash receptacle has been emptied) and then continuing to extend until the trash receptacle has been placed back on the ground. Up to crossover the lift cylinder will push on the lift arm; past crossover the cylinder will pull on the lift arm to maintain a desired rate of lowering.

Figure 7:
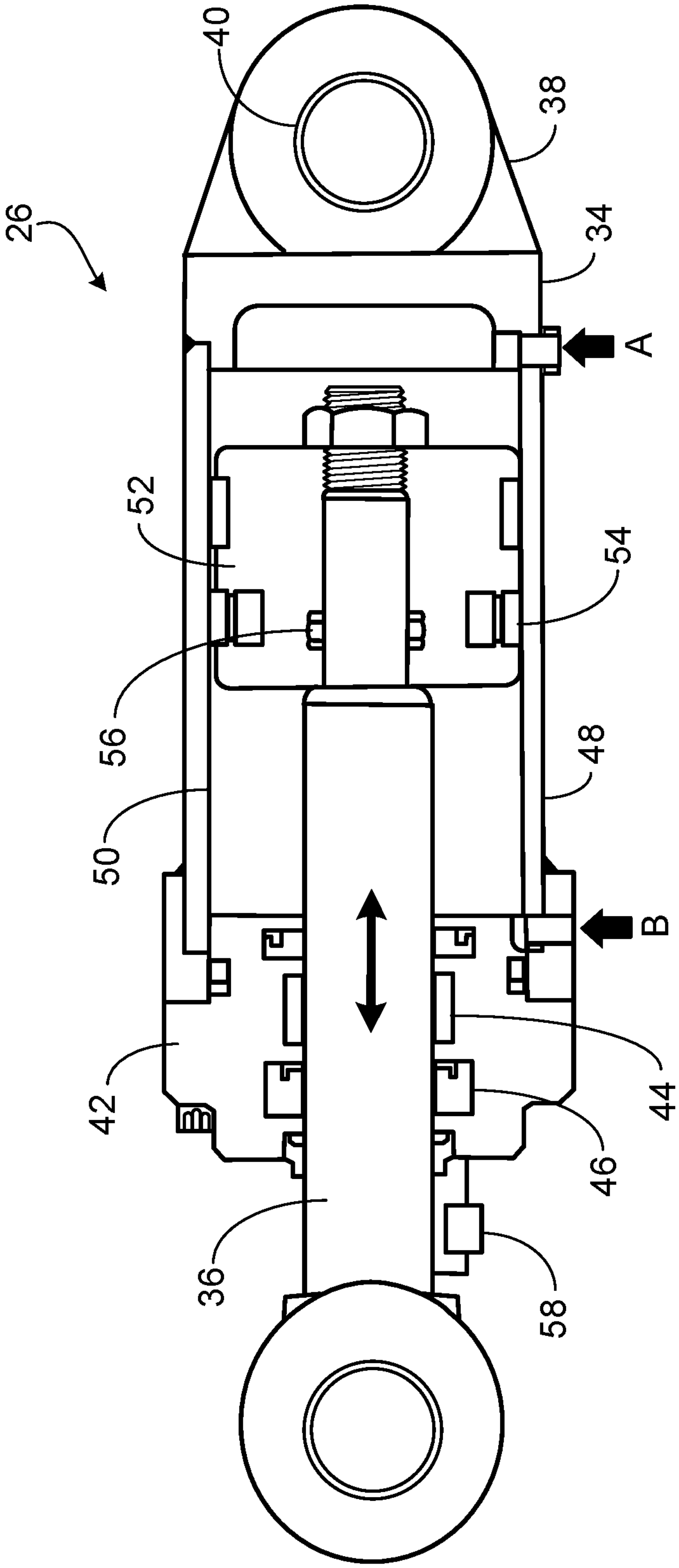
FIG. 7 is a schematic cross-section of one of the lift cylinders of the vehicle.

Referring next to FIG. 7, lift cylinder 26 is a typical double acting hydraulic cylinder with a housing 34 and an extendable cylinder rod 36. Housing 34 has a rear end cap

38 defining an aperture 40 for receiving a pin for pivotably mounting the cylinder housing to the vehicle frame. A front end cap 42 of the housing defines a bore along which the cylinder rod 36 slides during extension and retraction. The rod is supported by a journal bearing 44 within the front end cap and hydraulic fluid leakage between rod and end cap is controlled by at least one lip seal 46 within the end cap. Various rod seal configurations are known, and when rod seals begin to deteriorate or wear, excess leakage is generally noted by visual inspection without any disassembly of the system.

The two end caps of the housing are connected by a cylinder tube 48 that defines a tube bore 50. A piston 52 is fixed to the enclosed end of the cylinder rod and carries a sliding piston seal 54 that slides along the tube bore as the rod extends and retracts. Piston 52 divides the interior of the tube into two hydraulic chambers, each connected to the rest of the hydraulic system by a port. Force from hydraulic pressure applied at port A in excess of the force from hydraulic pressure at port B will cause the piston and the attached cylinder rod to move to the left in the figure, or to extend. Force from hydraulic pressure applied at port B in excess of the force at pressure at port A will cause the rod cylinder to retract. Given the effect of the presence of the rod itself on the pressure area of the piston, it requires less pressure differential to create a given extension force than to create the equivalent retraction force. The difference in pressure areas also means that a neutral applied hydraulic force, which occurs at crossover, does not correspond to a zero pressure differential.

Within the cylinder, the only paths of potential fluid leakage across the piston (i.e., between ports A and B) are between the piston and rod (i.e., across static seal 56) and between the piston and the cylinder tube (i.e., across sliding seal 54). Static seals are not prone to wear, but leakage across sliding seals tends to increase over the useful life of the cylinder. In general, an increase in leakage beyond a certain point is an indicator that the cylinder is nearing the end of its useful life and requires repair or replacement.

Unfortunately, leakage across the piston is internal to the cylinder and cannot be noted by simple visual inspection of the cylinder on the vehicle. Piston seal leakage does not create a loss of fluid, but does affect system performance. For example, piston seal leakage can result in a slower cylinder rod velocity for a given flow of fluid into the pressurized end of the cylinder. Because of the different geometries of the two pressure chambers, a given leakage rate at a nominal pressure will more greatly diminish the retraction rod velocity than the extension rod velocity. On the vehicle, the retraction rod velocity is associated with the lifting process and the extension rod velocity is associated with the lowering process. However, with the vehicle lift assembly raised past the crossover point (i.e., in an overhung condition), the cylinder generally needs to push, not pull, on the lift arm. During at least most of the lifting process, the pressure at port B will exceed the pressure at port A and any piston leakage will flow from left to right. But under certain conditions, depending on several factors including the weight and weight distribution of the raised trash receptacle, the pressure at port A may exceed the pressure at port B during lift before the cylinder is fully retracted, at which point piston leakage may flow from right to left. At the beginning of the lowering process, the pressure at port A will exceed that at port B and piston leakage will flow from right to left, but past the crossover point the pressure at port B will commonly exceed the pressure at port A as the cylinder pulls back on an otherwise free-falling lift assembly.

Position and motion characteristics of the cylinders may be monitored in several ways. A simple linear potentiometer can be coupled to the cylinder rod and housing to measure the instantaneous position of the rod with respect to the housing, for example. A derivative of displacement can provide velocity or slew rate. A second derivative can provide acceleration, etc. Some cylinders have potentiometers built into the cylinder, such as coupling the rod to the back end cap. If the lift assembly is considered a rigid body, a potentiometer can be coupled between some other portion of the lift assembly and the vehicle chassis to determine position of the lift assembly, from which hydraulic cylinder position, rod velocity, etc. can be derived. However, pivot bearing wear and component flexure introduce errors into such calculations. A rotary potentiometer or encoder can be placed at the arm pivot to measure the precise pivot position of the lift assembly. The following discussion will reference cylinder position information derived from one potentiometer 58 coupled to one lift cylinder, schematically illustrated in FIG. 7. It will be understood that such sensors can be provided on each of the two lift cylinders, either internally or externally.

Figure 8:
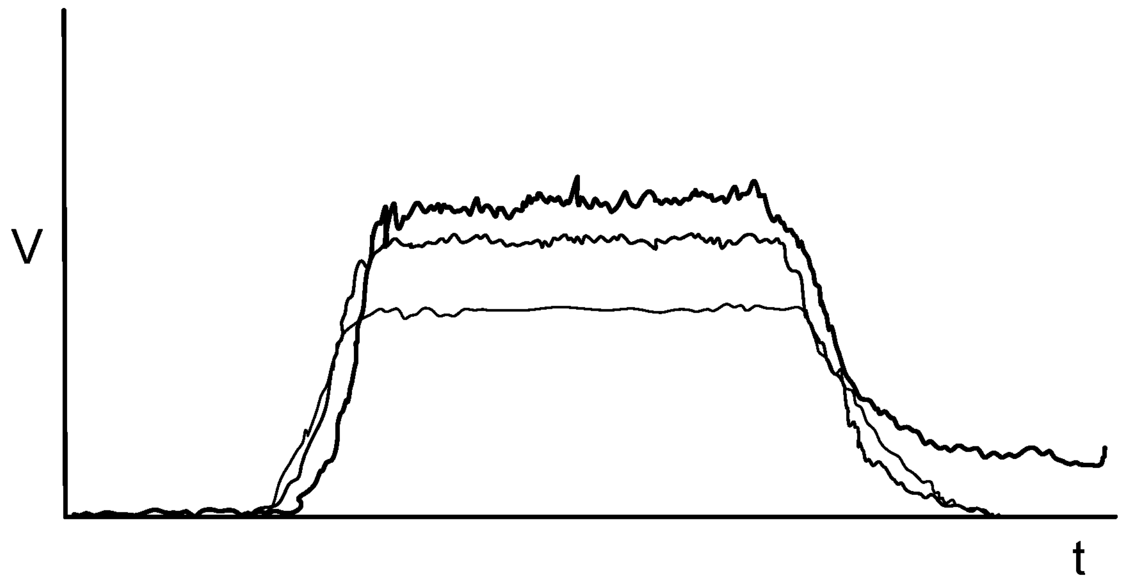
FIG. 8 is a chart of cylinder velocity as a function of time, showing the natural degradation of cylinder velocity due to increasing internal leakage.

Referring next to FIG. 8, from sensed cylinder position information the rod velocity 'V' of a lift cylinder can be determined as a function of time 't' for a given movement—such as during the lowering of the arms over a predetermined range of positions. As piston seal leakage increases, the average velocity during that movement will decrease, and the amount of time it takes to traverse that range of positions will correspondingly increase. This assumes other variables that affect cylinder rod velocity remaining relatively constant, such as hydraulic flow to the cylinder. The effects of certain variables can be minimized, such as by considering cylinder rod velocity only when the oil temperature is within a temperature range in which viscosity is relatively constant, and by choosing a motion cycle portion in which external loads on the cylinder are relatively constant—such as a portion of the lowering cycle in which the weight of the trash receptacle is more or less consistent. It can also be helpful to choose a motion cycle portion in which the pressure differential between the two ends of the cylinder is significant and in which any piston leakage will be more likely to affect rod velocity.

By capturing this data during a working lift cycle, no additional operator steps or cylinder test sequence is required. Data is simply gathered as the vehicle continues to work.

The chosen cylinder motion characteristic is thus monitored automatically over the life of the cylinder and compared to a reference value to determine if the characteristic has changed an amount predetermined to be an indication that cylinder service should be scheduled. The reference value can be a measurement taken when the cylinder is first put into service, such as an average derived from the first several motion cycles made after the cylinder is put into service. The amount of deviation necessary to trigger service can be derived empirically, such as by monitoring a cylinder over its useful life to note the rate of deterioration of that motion characteristic over time. Ideally, the maximum acceptable deviation amount, or percentage, used in the monitoring algorithm would be chosen to trigger cylinder replacement at the next planned vehicle system service with low risk that the piston seal will catastrophically fail but without unnecessarily limiting the working life of the cylinder. For example, it may be found by experimentation that once the effective rod velocity of a lift cylinder has decreased by 20% from new, it will decrease more rapidly until failure, and that such a decrease percentage tends to occur when the work performed by the cylinder (in terms of number of working cycles) has reached 95% of the expected work that can be performed without risk of unplanned downtime or having to cut a route short.

Figure 9:
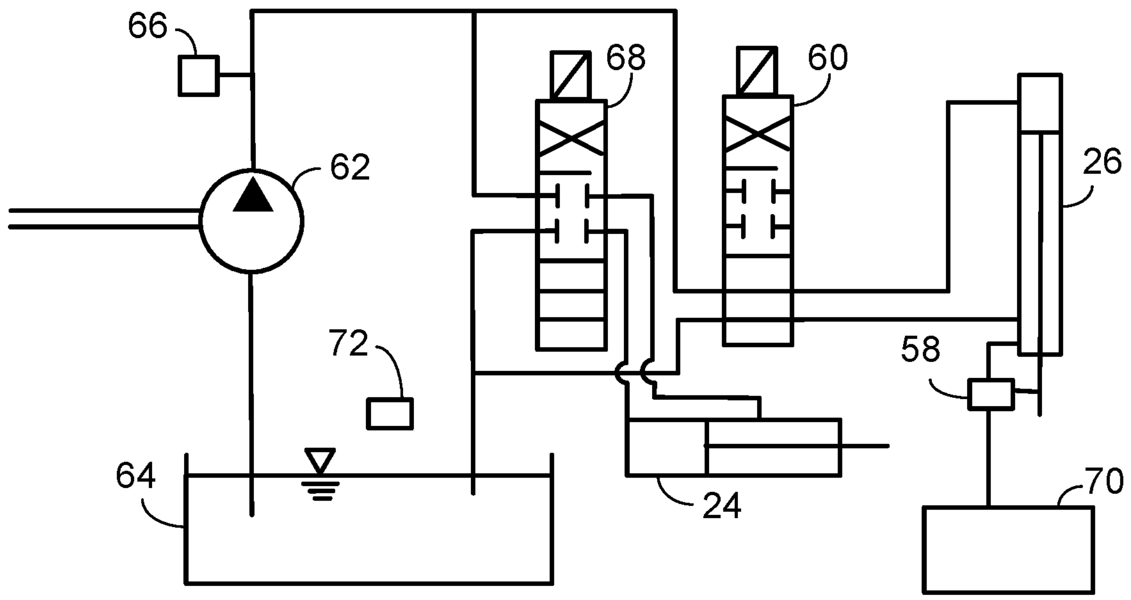
FIG. 9 schematically illustrates a hydraulic system of the vehicle.

Referring next to FIG. 9, lift cylinder 26 is part of a closed hydraulic system that operates multiple vehicle body systems. FIG. 9 is a simplified diagram illustrating representative components for performing two functions, but on most RCVs there will be other power hydraulic functions with additional components. This illustration is sufficient to describe the system features as they relate to the lift cylinders. Only one lift cylinder 26 is shown, but there would normally be a two lift cylinders connected in parallel hydraulic communication. These cylinders are connected to the rest of the hydraulic system through an associated lift valve 60 that is operated by electrical solenoid, either automatically or by the truck operator. Lift valve 60 is a bidirectional valve, operable to port hydraulic flow and pressure to either side of the lift cylinders to control both the raising and lowering of the lift assembly. Lift valve 60 can be provided with a spool configured to provide cylinder backpressure when the lift assembly is being lowered, such by effectively providing a one-way orifice to restrict flow out of the rod end of the cylinder. During either lifting or lowering, the valve can be operated to begin to close prior to end of cylinder travel to slow the rod velocity and reduce sharp deceleration or force of stop impacts. But in general, it is desirable to fully open the valve during at least most of each controlled movement, so as to achieve as fast a rod velocity as the pump flow will safely allow. The valve is preferably held fully open throughout the travel range in which position data is collected for evaluating piston seal leakage, to reduce variation caused by valve positioning.

Lift valve 60 is fed with pressurized fluid from a pump 62 driven mechanically by the vehicle drivetrain, such as from a power take-off. Fluid is drawn by the pump from a reservoir 64. Pump 62 may be, for example, a piston pump with load sense controls and a pressure limit. Ideally, pump 62 would be configured to provide a very consistent flow rate during each cylinder movement measurement, without variation over the monitored life of the cylinder. To the extent there are pump flow reductions over time, such as from a degradation of internal pump components, a flow rate sensor 66 can be placed to measure flow on either the high pressure side or the suction side of the pump, and the controller can adjust cylinder motion characteristic determinations to take into account pump flow rate changes. For example, in response to determining that the pump flow has degraded 10% over time, the determined piston velocity data can be increased by a corresponding amount for comparison purposes.

As noted above, the typical RCV will have several valves operating different body system cylinders. FIG. 9 shows, as an example, a fork valve 68 operable to drive the cylinders 24 to raise and lower the fork tines of the lift assembly. Valves 60 and 68 can be cartridge valves in a valve assembly that includes other valves fed by pump 62, such as another valve to drive a packer to compact the refuse dumped into the truck, or to lift or lower a tailgate of the truck to remove the compacted refuse, or to open or close a door at the top of the hopper, or to operate cylinders on a controllable refuse container carried on the lift assembly. In other words, the same pump 62 may feed many different hydraulic circuits. For this reason, it is preferable to monitor lift cylinder motion characteristics only while valve 60 is the only valve of the hydraulic system being operated.

Other vehicle hydraulic cylinders are also subject to performance degradation. Any of the cylinders noted above, or any other hydraulic cylinder operated to perform a repetitive function on a vehicle, can be equipped with a sensor to monitor a motion characteristic, with the controller configured to compare that motion characteristic with stored data to evaluate whether or not the cylinder should be scheduled for repair or replacement. As with the lift cylinders discussed above, cylinder leakage in any of the other hydraulic circuits is preferably evaluated when none of the other valves of the hydraulic system are being operated, and with fluid temperature within a range in which viscosity effects are minimal.

The above example describes monitoring a motion characteristic during a controlled movement of the cylinder during a work cycle. In another example, the motion characteristic can be monitored when the cylinder is not expected to be moving, such as when its associated valve is in a completely closed position and the cylinder is subjected to a known load. For the above-described lift cylinder, for example, the controller can be configured to monitor cylinder rod position as a function of time while the cylinder is only subjected to the effects of the weight of the lift assembly. Ideally, there would be no progressive extension of the cylinder due to internal leakage from the rod end to the closed end of the cylinder. Slow movement of the lift assembly to settle on a mechanical stop may indicate internal leakage. The lift assembly may be left in a predetermined raised position, such as one foot above a mechanical stop associated with the fully lowered position, when the vehicle is shut down at the end of a work day, and the controller can monitor the subsequent movement of the lift assembly until the vehicle is again started. Motion beyond a predetermined amount over a set amount of time would tend to indicate excessive leakage either internal to the valve block or internal to the cylinder. Similarly, cylinder displacement can be monitored during a dwell portion of a stroke cycle, during which the associated body component is left in a desired position for other reasons and no cylinder motion would be commanded or expected.

Alternatively, a preset motion sequence can be established for measuring cylinder motion characteristics over a part of it motion range, or over a set of sequential motions, under known load conditions. For example, lift cylinders can be tested with an empty automated carry can carried by the forks, moving with a fully-opened valve from a 20% retracted position to an 80% retracted position, and the results compared to a baseline measurement made over the same range when the cylinders were first installed.

Controller 70 receives a signal from sensor 58 (and from any other system sensors relevant to monitoring the hydraulic system, such as flow sensor 66) and contains sufficient processing capability to perform the simple calculations described above and to output an indication that the lift cylinder needs attention. While controller 70 can be constructed with analog circuitry, in this example controller 70 has a digital processor running software. In its simplest form, the software algorithm monitors the signals from position sensor 58 and hydraulic fluid temperature sensor 72, and the command to valve 60. When the valve is commanded to be fully open to lower the lift assembly, the temperature sensor signal indicates a temperature within the acceptable range, and the position sensor signal indicates the beginning of the motion range to be monitored, the controller starts measuring time until the position sensor signal indicates the end of the motion range to be monitored. The time lapsed during the motion range is compared to a stored value indicating, for example, the time lapsed during the motion range when the cylinder was new. If the difference in lapsed time is greater than a stored threshold percentage, the controller sends a signal indicating that the lift cylinder needs attention. This signal could be illumination of a light monitored by the operator, or to display an indication on a screen visible to the operator or a service technician, or a signal sent remotely to a central computer monitoring a fleet of vehicles for scheduled maintenance, for example. Optionally, the controller may further monitor a signal from pump flow sensor 66 and adjust the determined cylinder motion lapsed time inversely to the proportional amount the pump flow has decreased since the stored motion range value was obtained.

The monitored cylinder motion characteristic can be an average rod extension velocity, or an amount of time required for the cylinder to traverse a given range of rod positions during a known vehicle component operation, as two examples. Other examples will be apparent to those working in this industry. This approach provides a particularly simple and straightforward means of monitoring an internal performance characteristic of a cylinder that changes over time and that is not readily monitored by truck inspections by operators or service personnel. By predictive maintenance of hydraulic cylinders, undesired truck downtime and route interruptions can be avoided.

It is envisioned that a signal indicating a need for cylinder service, generated by the controller on the vehicle and sent to a remote service computer would trigger the automatic scheduling of vehicle maintenance, and perhaps even the automatic ordering of a replacement cylinder, for example.

While the above description has focused on hydraulic cylinders on refuse collection vehicles, the concepts disclosed herein can also be applied for monitoring cylinder performance and internal leakage in other systems, such as in stationary compacters or on other types of vehicles.

While a number of examples have been described for illustration purposes, the foregoing description is not intended to limit the scope of the invention, which is defined by the scope of the appended claims. There are and will be other examples and modifications within the scope of the following claims.

What is claimed is:

1. A refuse collection vehicle comprising:

one or more body components;

a hydraulic pump;

multiple hydraulic actuators each in hydraulic communication with the hydraulic pump through a respective hydraulic valve operable to supply hydraulic power to cause a respective actuator to move a respective vehicle body component of the one or more body components, at least one of the actuators comprising a hydraulic cylinder containing a piston carrying an internal cylinder seal and separating an internal cylinder volume into two portions, such that a potential leak path between the two portions is defined between the seal and an internal surface of the hydraulic cylinder;

a sensor responsive to movement of the piston; and a controller connected to the sensor to receive a sensor signal indicating piston movement information during an associated body component movement;

wherein the controller is configured to:

monitor, during one or more working cycles of the hydraulic cylinder, a motion characteristic of the hydraulic cylinder to evaluate an amount of fluid leakage between the two portions of the hydraulic cylinder, wherein, to monitor the motion characteristic, the controller is configured to:

determine a velocity of the piston during a particular portion of a predetermined body component movement of a body component of the one or more body components;

compare the determined velocity to a stored reference velocity, the comparison of the determined velocity to the stored reference velocity being indicative of the amount of fluid leakage; and in response to determining that a difference between the determined velocity and the stored reference velocity is greater than a predetermined value, trigger an indication that the refuse collection vehicle is in need of service.

2. The refuse collection vehicle of claim 1, wherein the velocity comprises an averaged velocity of the piston during the particular portion of the predetermined body component movement.

3. The refuse collection vehicle of claim 1, wherein:

the particular portion of the predetermined body component movement comprises a predetermined span of positions; and the velocity comprises an average velocity of the piston over the predetermined span of positions.

4. The refuse collection vehicle of claim 1, wherein the controller is configured to determine the velocity of the piston while the respective hydraulic valve operable to supply hydraulic power to the hydraulic cylinder is the only valve supplying hydraulic power to any of the hydraulic actuators.

5. The refuse collection vehicle of claim 1, wherein the respective hydraulic valve operable to supply hydraulic power to the hydraulic cylinder is an automated valve electrically controlled by a valve control signal to drive the automated valve to a determined open position during the particular portion of the predetermined body component movement.

6. The refuse collection vehicle of claim 5, wherein the automated valve is configured to be held in the determined open position while the controller determines the velocity of the piston.

7. The refuse collection vehicle of claim 1, wherein the controller is configured to determine the velocity of the piston as the piston moves toward a rod seal end of the hydraulic cylinder.

8. The refuse collection vehicle of claim 1, wherein the controller is configured to determine the velocity of the piston while the hydraulic valve operable to supply hydraulic power to the hydraulic cylinder is in a closed position and the piston is under a known applied axial load.

9. The refuse collection vehicle of claim 8, wherein the controller is configured to determine the velocity of the piston during a dwell portion of the particular portion of the predetermined body component movement.

10. The refuse collection vehicle of claim 1, wherein the controller is configured to determine the velocity of the piston only when a temperature of hydraulic fluid in a hydraulic system including the hydraulic pump is within a predetermined temperature range.

11. The refuse collection vehicle of claim 1, wherein the hydraulic cylinder is a lift cylinder connected to a lift arm of the refuse collection vehicle.

12. The refuse collection vehicle of claim 11, wherein the predetermined body component movement comprises:

a lift cycle performed by the lift arm of the refuse collection vehicle; or lowering the lift arm of the refuse collection vehicle.

13. The refuse collection of vehicle of claim 1, wherein the particular portion of the predetermined body component movement comprises a portion of the predetermined body component movement during which external loads on the hydraulic cylinder are constant.

14. The refuse collection vehicle of claim 1, wherein the predetermined value corresponds to a maximum acceptable deviation, from the stored reference velocity, that is determined based at least in part on:

an amount of expected working cycles of the hydraulic cylinder; and an amount of expected risk that the amount of fluid leakage would result in unplanned downtime of the refuse collection vehicle.

15. The refuse collection vehicle of claim 1, wherein the controller is configured to automatically monitor the motion characteristic during a working lift cycle without requiring any additional operator step or test sequence.

16. A method of prompting service of a hydraulic cylinder on a refuse collection vehicle comprising multiple hydraulic actuators and one or more body components, the method comprising:

monitoring, during one or more working cycles of the hydraulic cylinder, a motion characteristic of the hydraulic cylinder to evaluate an amount of fluid leakage between two portions of the hydraulic cylinder, the monitoring comprising:

determining a velocity of the hydraulic cylinder during a particular portion of a predetermined body component movement of a body component of the one or more body components;

comparing the determined velocity to a reference velocity, the comparison of the determined velocity to the stored reference velocity being indicative of the amount of fluid leakage; and in response to determining that a difference between the determined velocity and the reference velocity is greater than a predetermined value, triggering an indication that the refuse collection vehicle is in need of service.

17. The method of claim 16, wherein the velocity comprises an averaged velocity of the hydraulic cylinder during the particular portion of the predetermined body component movement of the body component.

18. The method of claim 16, wherein:

the particular portion of the predetermined body component movement comprises a predetermined span of positions; and the velocity comprises an average velocity of the hydraulic cylinder over the predetermined span of positions.

19. The method of claim 16, further comprising operating a hydraulic valve operable to supply hydraulic power to the hydraulic cylinder while the velocity is determined.

20. The method of claim 16, wherein the velocity is determined while the hydraulic cylinder is extended.

21. The method of claim 16, further comprising sensing temperature of hydraulic fluid in a hydraulic system including the hydraulic cylinder, and wherein the velocity is determined only when the sensed temperature is within a predetermined temperature range.

22. The method of claim 16, further comprising scheduling a service of the hydraulic cylinder in response to determining that the difference between the determined velocity and the reference velocity is greater than the predetermined value.

23. The method of claim 16, further comprising comparing a measured pump flow rate to a baseline pump flow rate associated with the reference velocity to determine flow degradation, and then adjusting the determined velocity as a function of the determined flow degradation before comparing the determined velocity to the reference velocity.

24. The method of claim 16, wherein the predetermined body component movement comprises a lift cycle performed by the lift arm of the refuse collection vehicle.

25. The method of claim 16, wherein the predetermined body component movement of the body component comprises lowering the lift arm of the refuse collection vehicle.

26. The method of claim 16, wherein the particular portion of the predetermined body component movement comprises a portion of the predetermined body component movement during which external loads on the hydraulic cylinder are constant.

* * * * *